(12) United States Patent
Miwa et al.

(10) Patent No.: US 8,082,296 B2
(45) Date of Patent: Dec. 20, 2011

(54) BUS SYSTEM

(75) Inventors: Mitsuhiko Miwa, Kawasaki (JP);
Masahiko Ohashi, Kawasaki (JP);
Miyuki Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 12/403,530

(22) Filed: Mar. 13, 2009

(65) Prior Publication Data

US 2009/0327406 A1    Dec. 31, 2009

(30) Foreign Application Priority Data

Jun. 27, 2008    (JP) ................. 2008-168951

(51) Int. Cl.
*G06F 15/16*    (2006.01)
(52) U.S. Cl. .................. 709/203; 709/217; 709/238
(58) Field of Classification Search .................. 709/202, 709/203, 217–219, 238
See application file for complete search history.

(56) References Cited

U.S. PATENT DOCUMENTS

| 6,735,169 B1 | 5/2004 | Albert et al. |
| 2002/0054035 A1 | 5/2002 | Nitta |
| 2003/0143988 A1 | 7/2003 | Jamadagani |
| 2005/0114480 A1 | 5/2005 | Ramamoorthy |
| 2006/0069778 A1 | 3/2006 | Ikegawa |

FOREIGN PATENT DOCUMENTS

| JP | 9-307583 | 11/1997 |
| WO | 00/21002 | 4/2000 |
| WO | 2004/084068 | 9/2004 |
| WO | 2004/102925 | 11/2004 |

OTHER PUBLICATIONS

European Search Report dated Nov. 19, 2009, from the corresponding European Application.
M. Urue+−A, et al. Overview of the eXtensible Service Discovery Framework (XSDF) <draft-uruena-xsdf-overview-00.txt>, Network Working Group, Internet-Draft, Mar. 17, 2004.

*Primary Examiner* — David Lazaro
(74) *Attorney, Agent, or Firm* — Fujitsu Patent Center

(57) ABSTRACT

A disclosed bus system includes multiple server agents corresponding one-to-one with server applications; and multiple user agents corresponding one-to-one with user applications. Each server agent includes a first server-agent communication unit for communicating with the corresponding server application; a server-agent determination unit for determining as communication targets one or more selected from the user agents and the other server agents; and a second server-agent communication unit for communicating with the communication targets determined by the server-agent determination unit. Each user agent includes a first user-agent communication unit for communicating with the corresponding user application; a user-agent determination unit for determining as communication targets one or more selected from the server agents and the other user agents; and a second user-agent communication unit for communicating with the communication targets determined by the user-agent determination unit.

13 Claims, 16 Drawing Sheets

FIG.7A

- AGENT NAME: SERVER AGENT a1
- DICTIONARY NAME: NS DICTIONARY 120
- CORRESPONDING AGENT ID: USER AGENT u1
- CORRESPONDING APPLICATION ID: SERVER APPLICATION A1

FIG.7B

- AGENT NAME: USER AGENT u1
- DICTIONARY NAME: NS DICTIONARY 120
- CORRESPONDING AGENT ID: SERVER AGENT a1
- CORRESPONDING APPLICATION ID: USER APPLICATION U1

FIG.16

| SERVICE NAME | SERVER AGENT NAME | SERVER APPLICATION NAME |
|---|---|---|
| SEARCH | SERVER AGENT a1 | SERVER APPLICATION A1 |
| | SERVER AGENT b1 | SERVER APPLICATION B1 |
| | SERVER AGENT c1 | SERVER APPLICATION C1 |
| ○○ | SERVER AGENT xx | SERVER APPLICATION xx |
| △△ | SERVER AGENT yy | SERVER APPLICATION yy |
| .. | .. | .. |

130

BUS SYSTEM

CROSS-REFERENCE TO RELATED APPLICATIONS

This application is based upon and claims the benefit of priority of Japanese Patent Application 2008-168951, filed on Jun. 27, 2008, the entire contents of which are hereby incorporated herein by reference.

FIELD

The present disclosure is directed to a bus system, such as an ESB (Enterprise Service Bus), built on a network.

BACKGROUND

FIG. 1 shows a configuration example of a conventional web-based network system used on the Internet. In FIG. 1, Pull-style communication is established in which a request is placed from a web browser group (client group) 3 to a business application group (application server group) 2 which uses a database (database server) 1, and a response is sent to the web browser group 3 in return. Note that in this web-based network system, a request from the web browser group 3 is a communication trigger, and hence Push-style communication initiated by the business application group 2 on the server side toward the web browser group 3 is not available.

To deal with demands of the server for the Push-style communication, a bus system, for example, is used.

The ESB is one example of a publicly known bus concept, and various studies have been conducted thereon (see, for example: www.atmarkit.co.jp/aig/04biz/esb.html). The ESB refers to an architecture configuration which integrates applications based on the SOA (Service Oriented Architecture) having a "bus" concept, or refers to a software product which serves as the base for providing such an architecture configuration. The ESB concept is a software design notion of building an SOA system, which makes accesses to services (applications and components) and enables coordination and cooperation of multiple services, on the basis of a logical software bus. Accordingly, although its specific functions and implementation are different among individual products and systems, the ESB generally refers to EAI (Enterprise Application Integration) products having a standard SOA interface; sophisticated message buses supporting multi-protocols; or integrated middleware technologies and middleware products having such a message bus. That is, the ESB functions as an integration intermediary enabling mutual cooperation of services developed compatible with open standard specifications, such as web services and JCA (J2EE Connector Architecture). A core message bus supports standard protocols, such as HTTP (Hyper Text Transfer Protocol), SOAP (Simple Object Access Protocol), and JMS (Java (registered trademark) Message Service), provides functions including "publish and subscribe", "store-forward message" and "routing", and incorporates services in/out of synchronization. In a complete SOA environment, the ESB can employ a distributed processing architecture; however, many actual ESB products also have legacy connection and data conversion features, and thus can be used as EAI in a broad sense. Furthermore, some ESB products provide functions of security, load distribution, process modeling and the like.

FIG. 2 shows a configuration example of a conventional bus system. A bus system BS is interposed among applications AP1-AP6 ... to mediate all communication between the applications, whereby both Pull-style communication and Push-style communication can be freely performed. Note that communication between the bus system BS and each application AP1-AP6 ... is made possible in various ways, such as by HTTP, SOAP, JMS and the like.

Such a conventional network bus system processes server applications and user applications connected to the bus system by communicating with them one at a time. Therefore, with an increase in the number of server applications and user applications connected to the bus system, the bus system needs to accommodate and be able to process the increased workloads.

One example of implementing load distribution is building a bus system with multiple processes and enabling interprocess communication, thereby distributing workloads. Specific examples of such load distribution are "ESB Mule model", "endpoint ESB", "Artix" and "Celtix". The "ESB Mule model" is a lightweight messaging framework having a distributed object intermediary for managing communication between applications (www.mulesource.org/display/JPNDOC/Architecture+Overview). The "endpoint ESB" is based on the concept of aggregating everything at endpoints, and forms an ESB by combining the endpoints (www.mulesource.org/display/JPNDOC/Mule+Endpoints; and www-.blogs.iona.com/essence/2006/11/esb__1.html). One implementation example of the endpoint ESB is "Artix", which is an ESB following the CORBA (Common Object Request Broker Architecture) standard. "Celtix" is an open source ESB (www.celtix.objectweb.org/).

FIG. 3 shows a configuration example of a conventional bus system in which load distribution is achieved using multiple processes. In FIG. 3, the bus system BS accessed by the applications AP1-AP5 includes processes P1-P5. Communication is controlled using interprocess communication between respective processes P1-P5, whereby load distribution is achieved. Herewith, even if the number of applications increases, scale-out of the bus system (i.e. improving the performance of the entire bus system BS by increasing the number of processes) can be achieved.

Patent Document 1: Japanese Laid-open Patent Application Publication No. H09-307583

Infrastructure for developing and implementing new communications services by combining existing phone services and data-based services, such as e-mail services, has been studied in recent years. The new infrastructure is expected not only to provide existing line switching services in a SIP-based (Session Initiation Protocol based) packet network, but also to enable the addition of novel functions. One example of such infrastructure is the SDP (Service Delivery Platform) implemented in the NGN (Next Generation Network).

In an NGN environment, a great number of users are likely to access server applications via a bus system. In particular, if a certain service becomes popular, it is often the case that a large number of users make accesses to the service at one time. In such a situation, there are limitations to scale-out with the use of the above-mentioned existing bus-system technologies or the implementation of such a bus system. That is, if the number of users drastically increases and accesses are concentrated on a certain application, such scale-out capabilities are not sufficient to deal with the situation.

FIG. 4 shows load concentration on certain server applications and processes. In FIG. 4, the bus system BS includes multiple processes P1-P5, on the upper side of which a server application group (server applications A1, A2, B1, C1 ...) is depicted, and on the lower side of which a user application group (user applications U1-U4 ...) is depicted. Each application is connected to one of the processes P1-P5 forming the bus system BS. Interprocess routing is provided among the processes P1-P5, thereby achieving load distribution. Note that the server applications A1 and A2 provide the same service (application A).

Assume here that the application A gains popularity. Accesses from the user application group (the user applications U1-U4 . . . ) concentrate on the popular application A (server applications A1 and A2) at once, and the communications traffic becomes high. In addition, the number of user applications in the user application group grows with a rumor or trend that the application A has a high popularity. The number of user applications could reach hundreds of thousands to several millions. Such numerous user applications U1-U4 . . . all together initiate accesses to the server applications A1 and A2.

The communications traffic is processed by the multiple processes P1-P5; however, workload imbalance is generated among the processes P1-P5. The workload is particularly concentrated on the terminal process P1 which performs direct communication with the server applications A1 and A2. The bus system BS cannot prevent the load concentration, and as a result, the scale-out of the bus system BS becomes difficult.

Thus, the conventional bus system has limitations in its scale-out capabilities when workload concentration occurs, and accordingly, the scale-out of the bus system cannot be achieved.

Patent Document 1 discloses a super agent for transmitting and receiving data between common memories of individual servers each having databases. However, in this technology also, the workload is concentrated on the inter-router communication and the super agent itself, and the scale-out is therefore difficult to achieve.

In addition to the above-described load concentration, there is another problem that each application cannot perform communication unless an application to be a communication target is determined. For example, what users usually want is services provided by server applications, and it is not always the case that they can identify server applications which offer the users' desired services. In particular, in the case where server applications offering similar services (e.g. search services) are newly created and gone very often, it is unreasonable to expect that users are able to identify their target server applications.

SUMMARY

One aspect of the present disclosure is a bus system including multiple server agents corresponding one-to-one with server applications; and multiple user agents corresponding one-to-one with user applications. Each of the server agents includes a first server-agent communication unit configured to communicate with the corresponding one of the server applications; a server-agent determination unit configured to determine as communication targets one or more selected from the user agents and the other server agents; and a second server-agent communication unit configured to communicate with the communication targets determined by the server-agent determination unit. Each of the user agents includes a first user-agent communication unit configured to communicate with the corresponding one of the user applications; a user-agent determination unit configured to determine as communication targets one or more selected from the server agents and the other user agents; and a second user-agent communication unit configured to communicate with the communication targets determined by the user-agent determination unit.

Another aspect of the present disclosure is a bus system control method applied to a bus system including multiple server agents corresponding one-to-one with server applications and multiple user agents corresponding one-to-one with user applications. The bus system control method includes allowing at least one of the user agents to communicate with the corresponding one of the user applications; determining, as communication targets of one of the user agents, one or more selected from the server agents and the other user agents; allowing the one of the user agents to communicate with the communication targets; and allowing at least one of the server agents to communicate with the corresponding one of the server applications.

Yet another aspect of the present disclosure is a bus system control method used on a bus system including multiple server agents corresponding one-to-one with server applications and multiple user agents corresponding one-to-one with user applications. The bus system control method includes allowing at least one of the server agents to communicate with the corresponding one of the server applications; determining, as communication targets of one of the server agents, one or more selected from the user agents and the other server agents; allowing the one of the server agents to communicate with the communication targets; and allowing at least one of the user agents to communicate with the corresponding one of the user applications.

The object and advantages of the disclosure will be realized and attained by means of the elements and combinations particularly pointed out in the claims.

It is to be understood that both the foregoing general description and the following detailed description are exemplary and explanatory and are not restrictive of the present disclosure as claimed.

BRIEF DESCRIPTION OF DRAWINGS

FIGS. 7A and 7B show examples of holding data;

FIG. 16 shows an example of a correspondence table held in a scenario interpretation unit.

DESCRIPTION OF EMBODIMENT

An embodiment that describes the best mode for carrying out the present disclosure is explained next.

<Basic Configuration>

Figure 1:
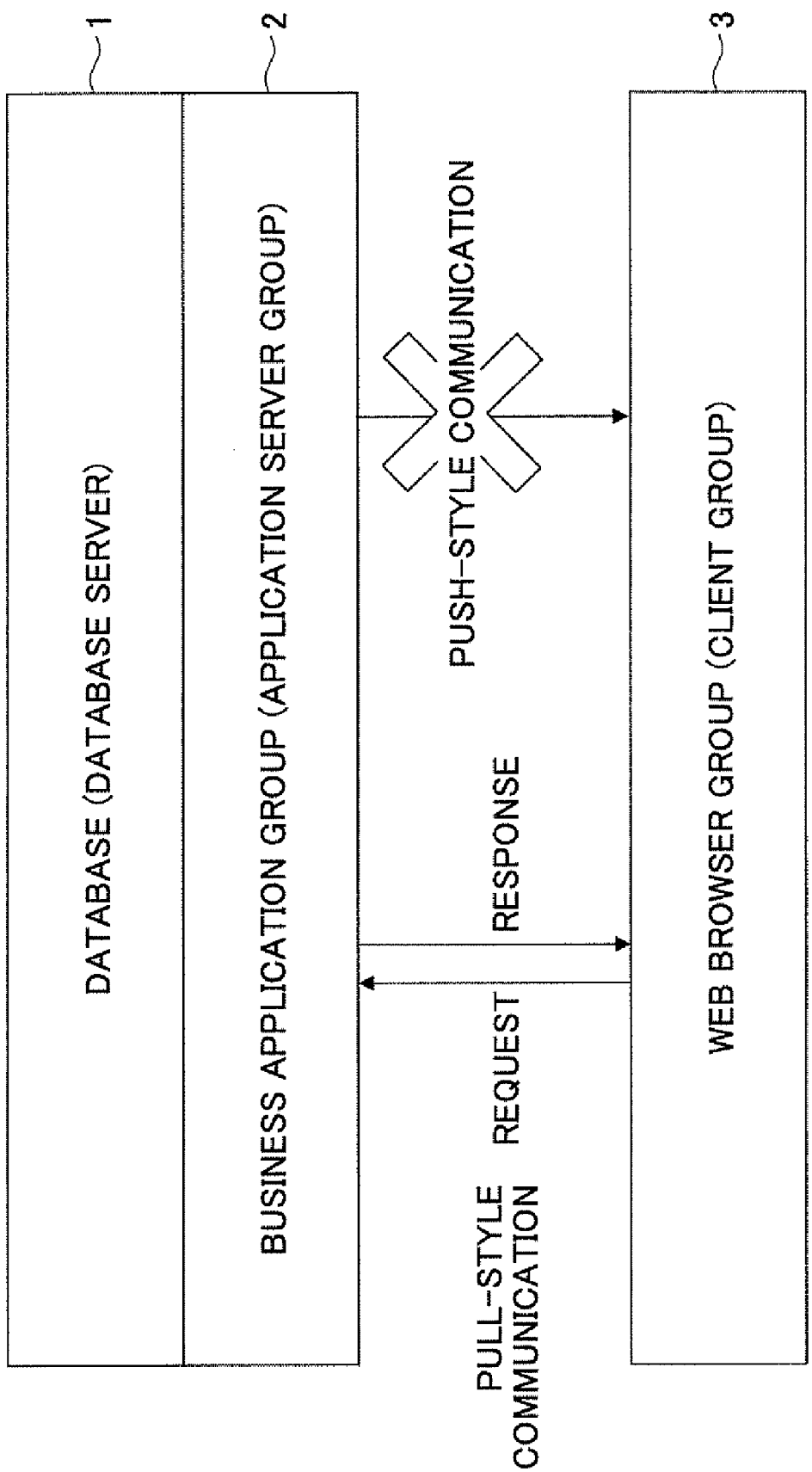
FIG. 1 shows a configuration example of a conventional web-based network system.
Figure 2:
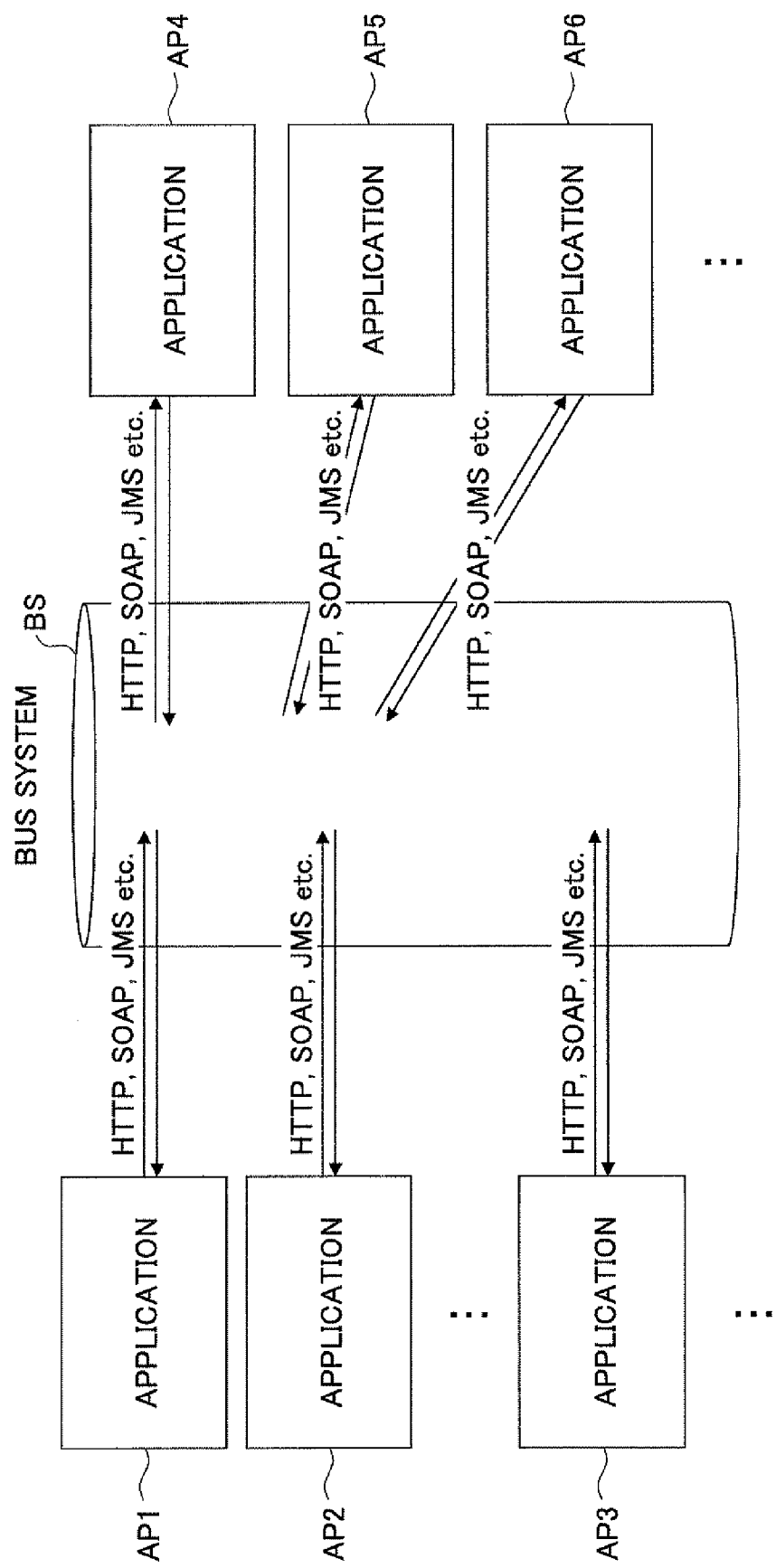
FIG. 2 shows a configuration example of a conventional bus system.
Figure 3:
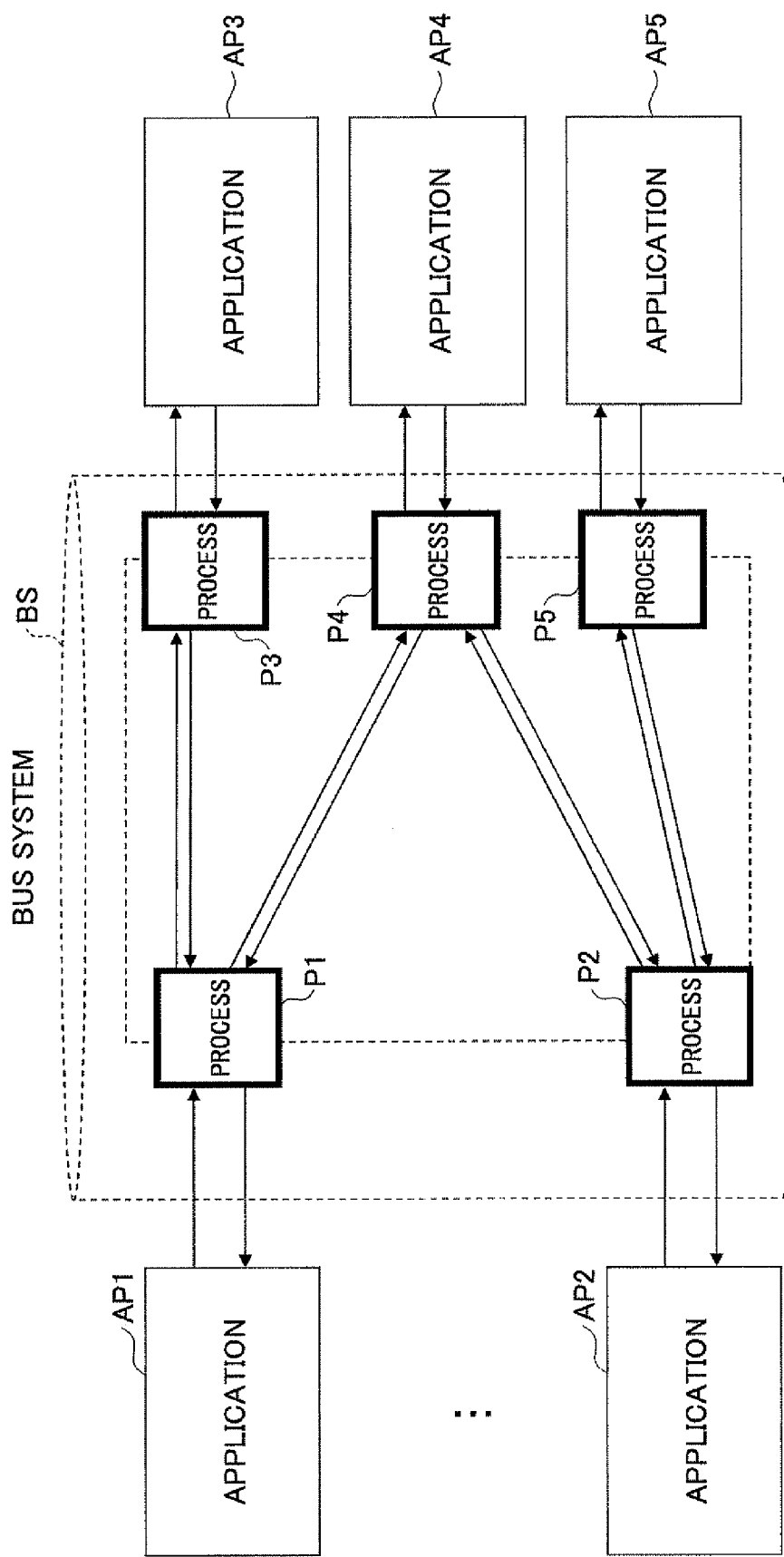
FIG. 3 shows another configuration example of a conventional bus system.
Figure 4:
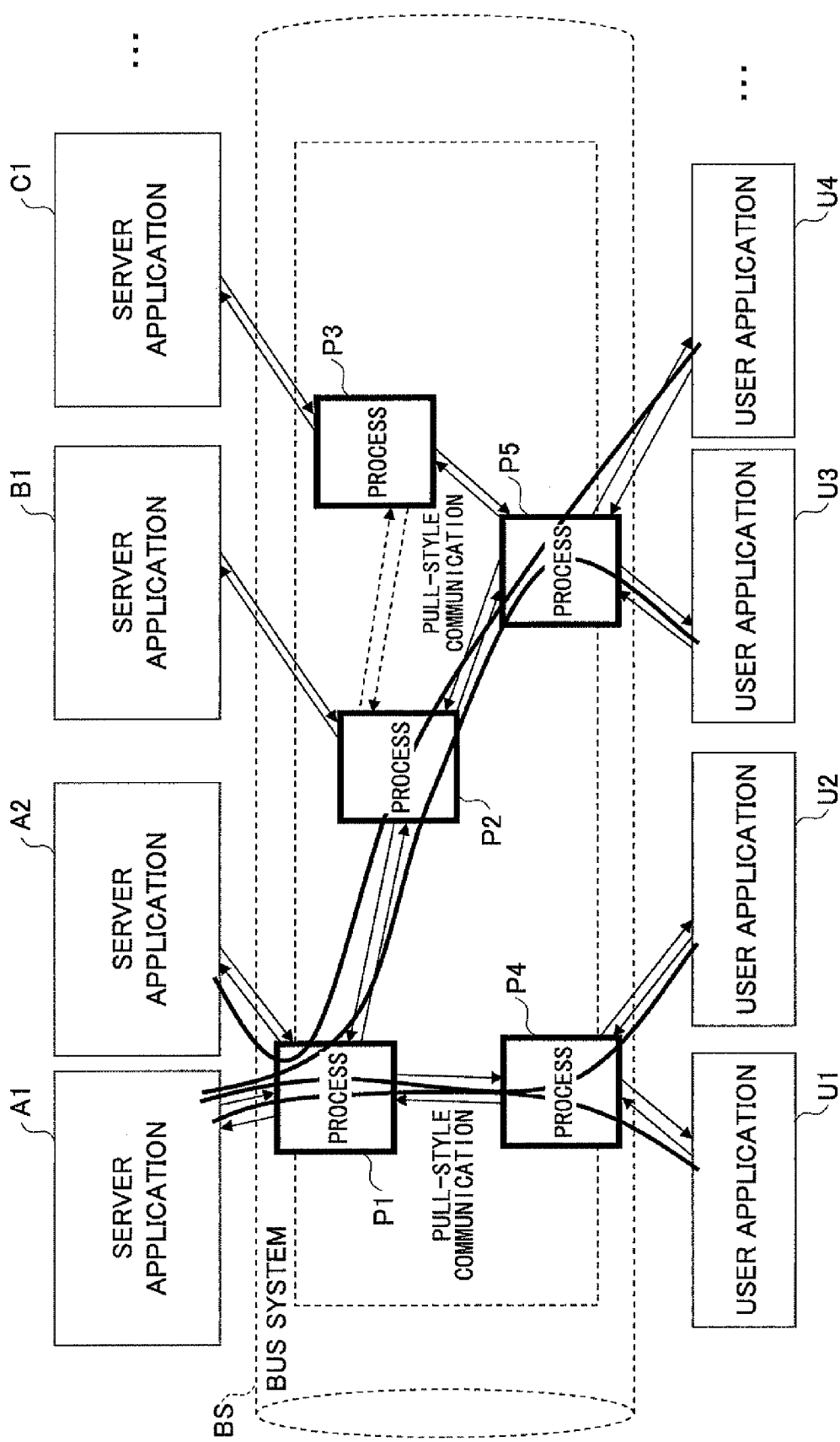
FIG. 4 shows yet another configuration example of a conventional bus system.
Figure 5:
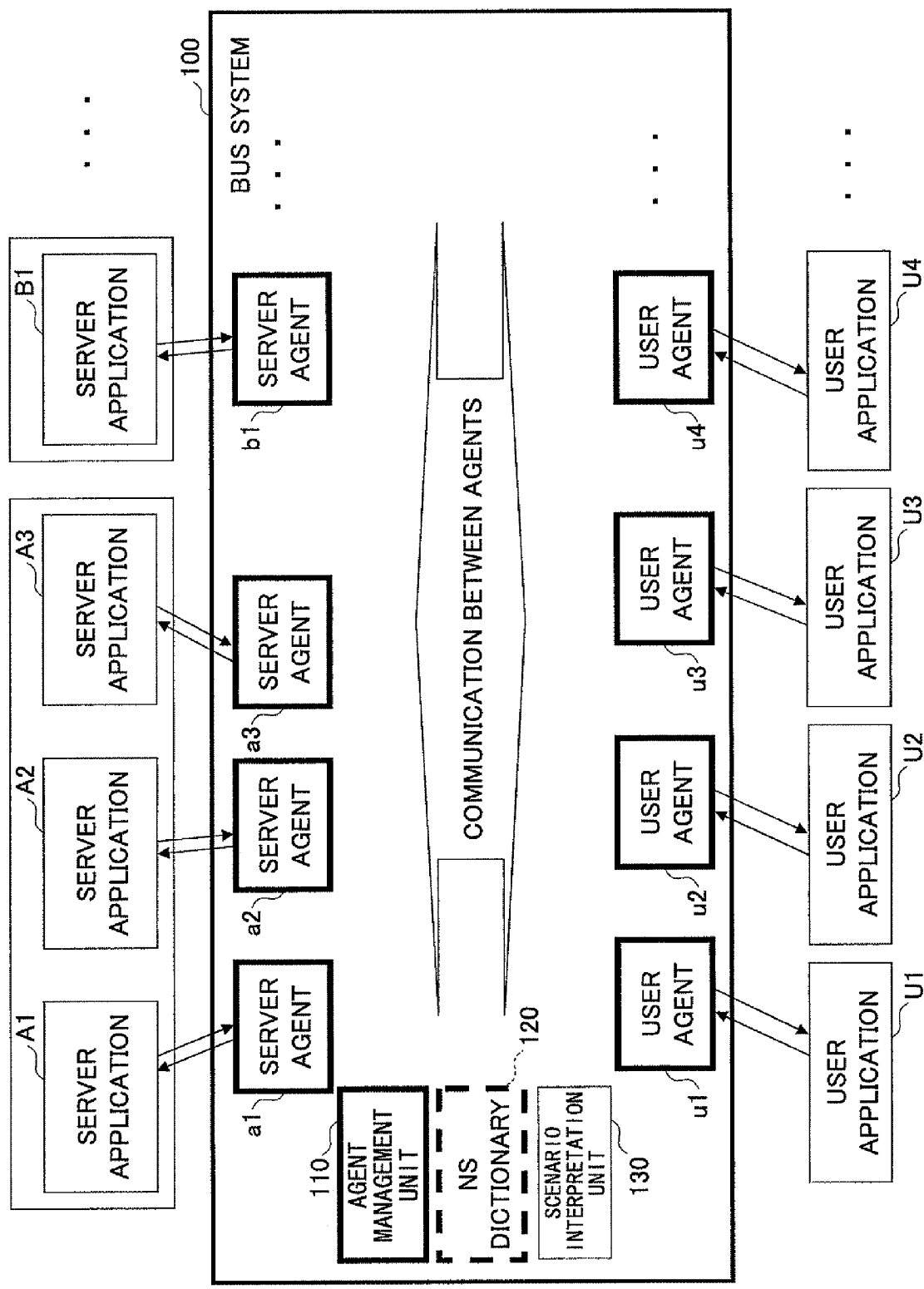
FIG. 5 shows a configuration example of a bus system according to one embodiment of the present disclosure.

FIG. 5 shows a configuration example of a bus system according to one embodiment of the present disclosure.

In FIG. 5, a server application group (server applications A1-A3, B1 . . . ) and a user application group (user application U1-U4 . . . ) are depicted on the upper side and the lower side, respectively, of a bus system 100. The server applications A1-A3 provide the same server application A.

The bus system 100 includes server agents a1-a3, b1 . . . corresponding one-to-one with the server applications A1-A3, B1 . . . and user agents u1-u4 . . . corresponding one-to-one with the user applications U1-U4 . . . . Each agent (the server agents a1-a3, b1 . . . and user agents u1-u4 . . . ) is implemented by a computer program executed on a single server or multiple distributed servers.

The bus system 100 also includes an agent management unit 110 for managing addition, removal and the like of each agent; a NS (Network Service) dictionary 120 for managing communication destinations and the like of the agents; and a scenario interpretation unit 130 for interpreting scenarios (keywords and the like indicating services) and determining communication targets of the agents. Note that the NS dictionary 120 may be omitted by distributing the same content to each agent for holding thereof.

Figure 6:
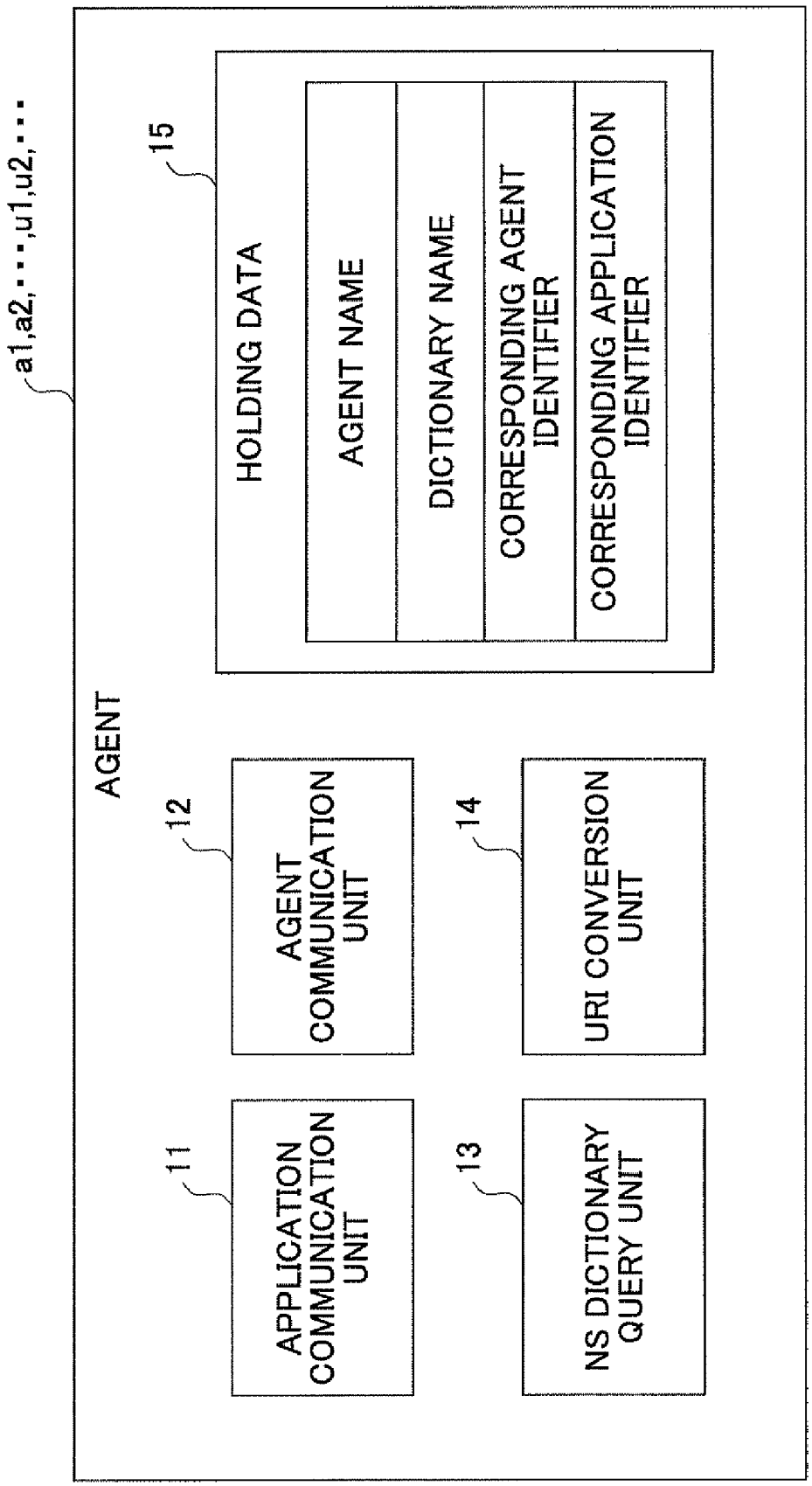
FIG. 6 shows a configuration example of an agent.

FIG. 6 shows a configuration example of each agent (server agents a1-a3, b1 . . . and user agents u1-u4 . . . ). In FIG. 6, the agent includes an application communication unit 11, an agent communication unit 12, a NS dictionary query unit 13, a URI conversion unit 14, and holding data 15.

The application communication unit 11 has a function of communicating with server applications and user applications. The agent communication unit 12 has a function of communicating with other agents. The NS dictionary query unit 13 has a function of querying of the NS dictionary 120 about a corresponding agent name in response to receiving a URI (Uniform Resource Identifier) from a user application or a server application. The URI conversion unit 14 has a function of replacing the URI with a different one using the agent name obtained from the NS dictionary query unit 13.

The holding data 15 include an "agent name" which holds a name for identifying the agent itself; a "dictionary name" which holds a name for identifying the NS dictionary 120 to which an inquiry is to be made; a "corresponding agent identifier" which holds an identifier of an agent obtained as a result of the inquiry to the NS dictionary 120; and a "corresponding application identifier" which holds an identifier of a corresponding application. FIGS. 7A and 7B show examples of the holding data 15. FIG. 7A is an example of the holding data 15 included in a server agent, and FIG. 7B is an example of the holding data 15 included in a user agent.

Referring to FIG. 5, the server agents a1-a3, b1 . . . communicate with the corresponding server applications A1-A3, B1 . . . , respectively. As a communication interface between a server agent and its corresponding server application, a versatile interface is used without changing the existing bus system.

The user agents u1-u4 . . . communicate with the corresponding user applications U1-U4 . . . , respectively. As a communication interface between a user agent and its corresponding user application, a versatile interface is used without changing the existing bus system.

Load distribution is achieved when each agent communicates with other agents and determines a communication path. In this manner, a load is prevented from concentrating on a certain server application and its corresponding server agent. A communication path is determined by determining another agent which is a communication target identified when an inquiry to the NS dictionary 120 is made. Alternatively, a communication path may be determined by agents directly communicating with each other.

Due to having such basic functions, the bus system 100 of the present embodiment is able to flexibly deal with both Pull-style and Push-style communication and also achieve load distribution.

In addition, a communication path may be determined by the scenario interpretation unit 130 if a scenario is written in communication from the user application U1-U4 . . . . As a result, communication can be performed even if a target application is not determined.

<Pull-Style Communication>

Figure 8:
FIG. 8 shows an example of a NS dictionary applied to Pull-style communication.

FIG. 8 shows an example of the NS dictionary 120 applied to Pull-style communication. Referring to FIG. 8, the NS dictionary 120 includes a field for "service URI", each content of which indicates a URI at which a service specified by a user application is provided; a field for "server agent name", each content of which identifies a server agent corresponding to the service URI; a field for "condition", each content of which indicates a load condition (low load, high load or the like) of the server agent and its corresponding server application; and a field of "response history", each content of which indicates a history (a time stamp, a serial number or the like) of reporting the server agent in answer to an inquiry.

Figure 9:
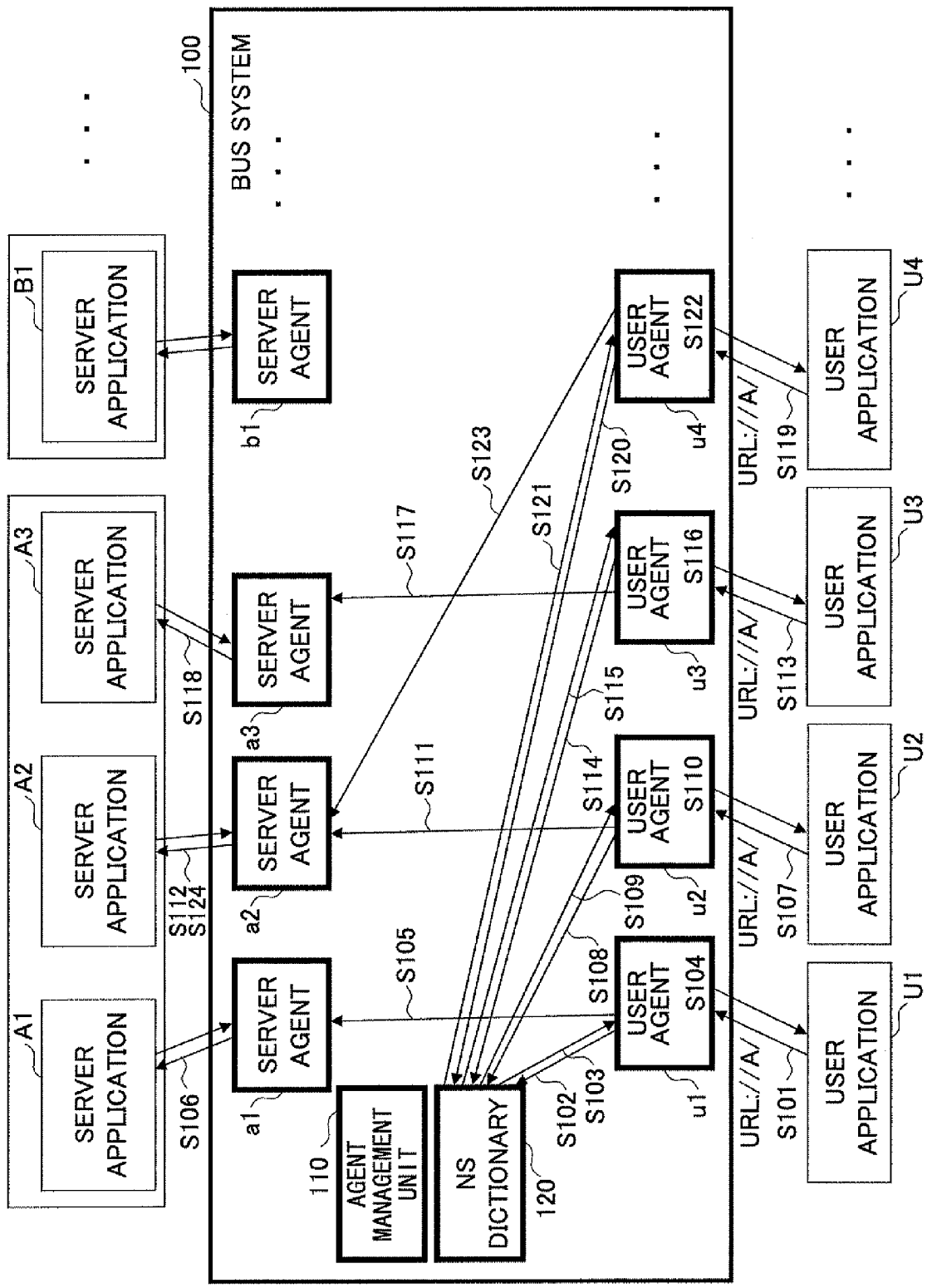
FIG. 9 shows an operational example in Pull-style communication.
Figure 10:
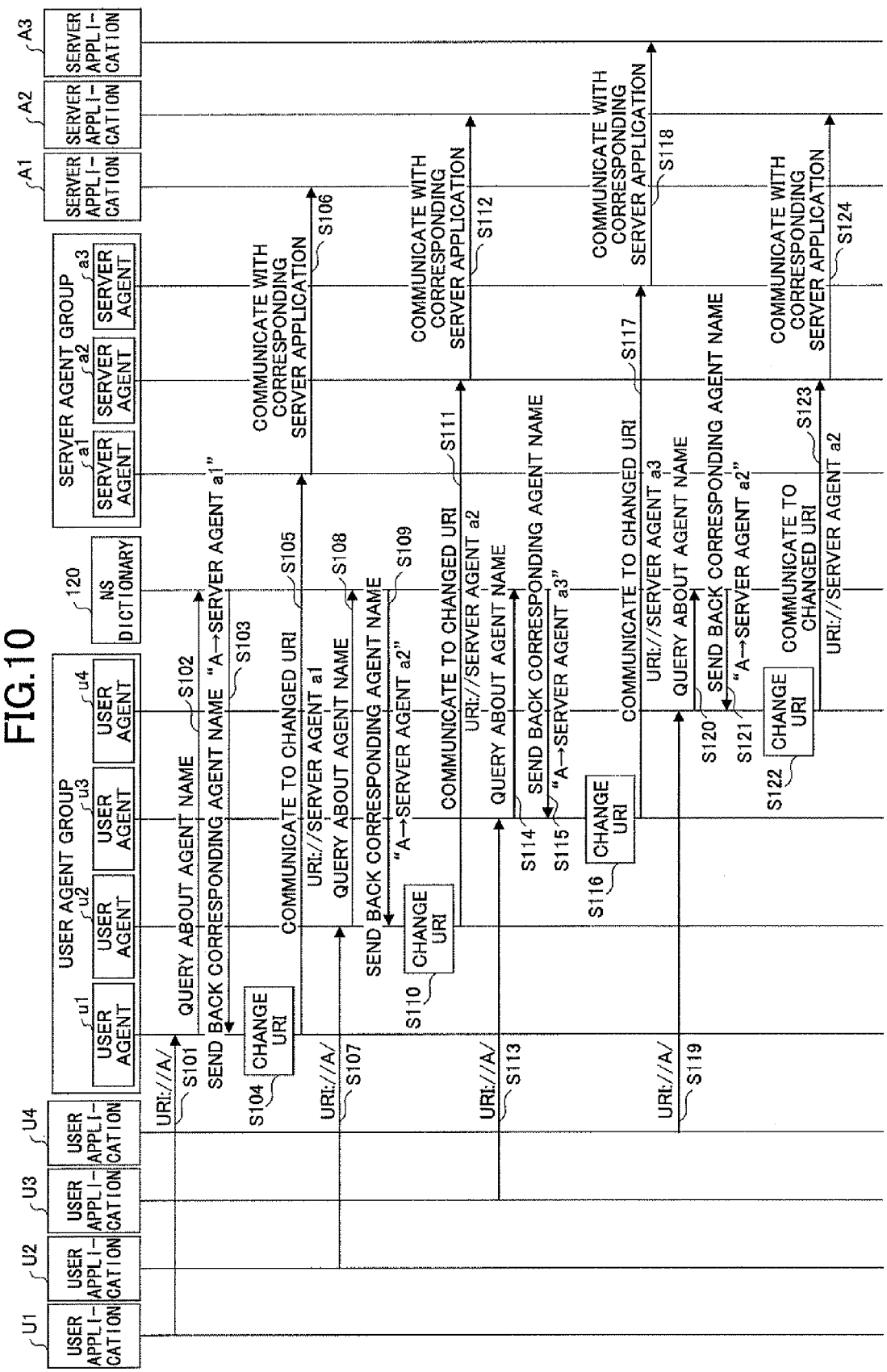
FIG. 10 is a sequence diagram of Pull-style communication operation.

FIG. 9 shows an operational example in Pull-style communication, and FIG. 10 is a sequence diagram of the operation. The configuration of FIG. 9 is the same as that of FIG. 5, except for the NS dictionary 120 being implemented and the scenario interpretation unit 130 being omitted.

Assume here that a service (application A) provided by the server applications A1-A3 is popular and the application A is therefore called from many user applications U1-U4 . . . . Also assume that, in the course of the application A being called from the many user applications U1-U4 . . . , the load condition of the server application A1 and the server agent a1 changes from low load to high load, and that the load condition change is recorded in the NS dictionary 120.

Referring to FIGS. 9 and 10, when "URI://A/" is transmitted from the user application U1 to the corresponding user agent u1 (Step S101), the user agent u1 specifies the service URI "A" and inquires of the NS dictionary 120 about an agent name (Step S102). Based on the corresponding relationship illustrated in FIG. 8, the NS dictionary 120 determines that the service URI "A" corresponds to the "server agent a1", "server agent a2" and "server agent a3". The NS dictionary 120 further refers to the condition and response history, and specifies in a round robin manner a server agent placed earlier in the order of registration, not operating under a high load condition and having an older response history. Assume here that the first "server agent a1" is operating under a "low load" condition and has an older response history. Accordingly, the NS dictionary 120 reports back the "server agent a1" to the user agent u1 as a corresponding agent name (Step S103).

Subsequently, the user agent u1 replaces the original URI with a new one using the corresponding agent name obtained from the NS dictionary 120 (Step S104), and communicates with the server agent a1 indicated by the replaced URI (Step S105). Then, the server agent a1 communicates with the corresponding server application A1 (Step S106). Herewith, a desired content is sent to the user application U1, via the server agent a1 and the user agent u1, as a response from the server application A1.

Figure 11:
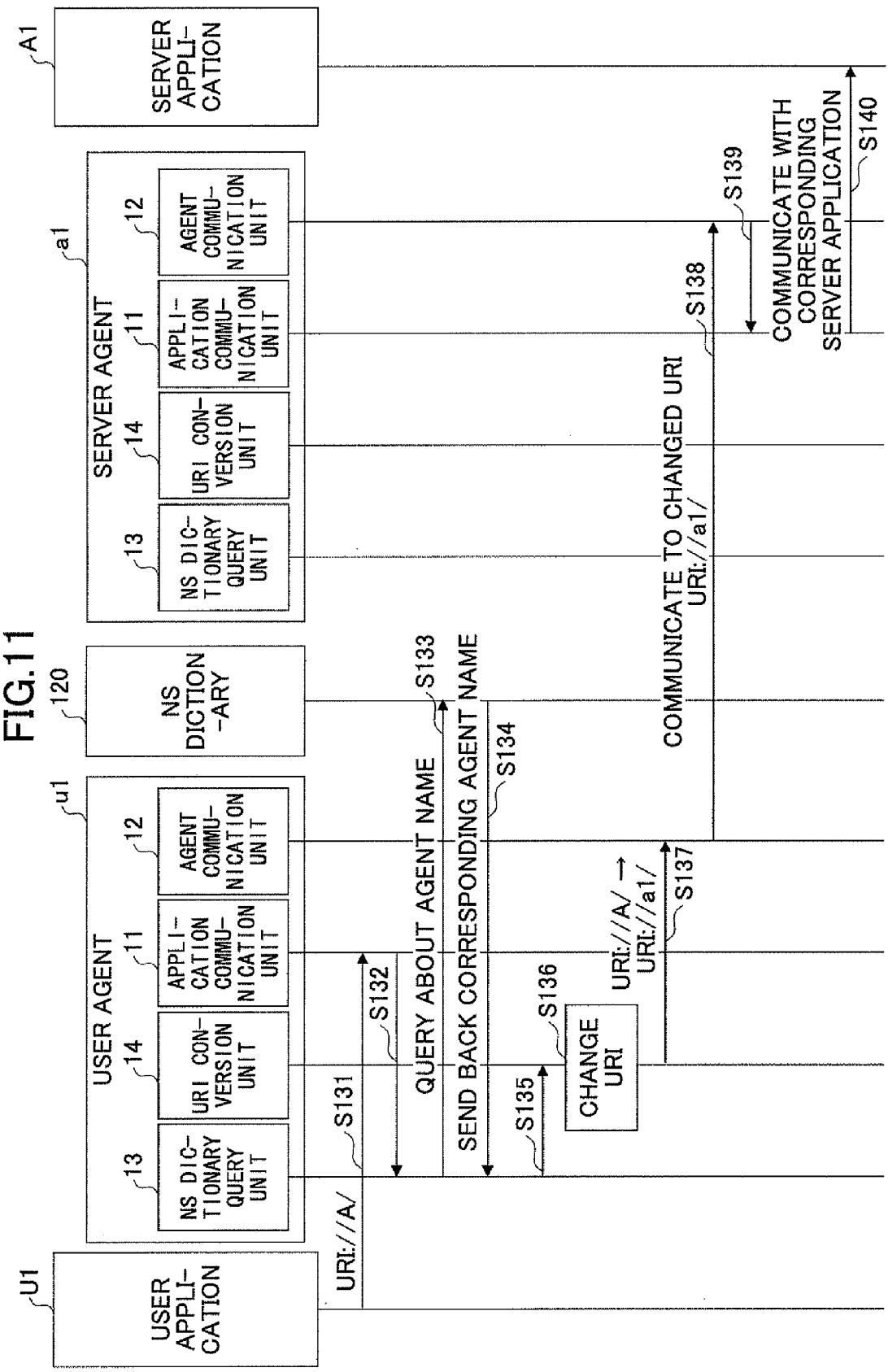
FIG. 11 is a sequence diagram showing details of operational steps performed by components of the agents.

FIG. 11 is a sequence diagram showing details of operational steps S101-S106 of FIG. 10 performed by components of the agents (the user agent u1 and the server agent a1).

Referring to FIG. 11, when a URI is transmitted from the user application U1 to the corresponding user agent u1 (Step S131), the application communication unit 11 receives the URI. The application communication unit 11 passes the received information to the NS dictionary query unit 13 (Step S132), which then specifies the service URI and inquires of the NS dictionary 120 about an agent name (Step S133), and subsequently receives a corresponding agent name reported back from the NS dictionary 120 (Step S134).

Next, the NS dictionary query unit 13 passes the received information to the URI conversion unit 14 (Step S135), which then replaces the URI with a new one using the corresponding agent name obtained from the NS dictionary 120 (Step S136) and passes the replaced URI to the agent communication unit 12 (Step S137). The agent communication unit 12 communicates with the server agent a1 indicated by the replaced URI (Step S138). On the server agent a1 side, the agent communication unit 12 receives information in the communication and passes the received information to the application communication unit 11 (Step S139), which then communicates with the corresponding server application A1 (Step S140).

Referring back to FIGS. 9 and 10, similarly when "URI://A/" is transmitted from the user application U2 to the corresponding user agent u2 (Step S107), the user agent u2 specifies the service URI "A" and inquires of the NS dictionary 120 about an agent name (Step S108). Based on the corresponding relationship illustrated in FIG. 8, the NS dictionary 120 determines that the service URI "A" corresponds to the "server agent a1", "server agent a2" and "server agent a3". The NS dictionary 120 further refers to the condition and response history, and specifies in a round robin manner a server agent placed earlier in the order of registration, not operating under a high load condition and having an older response history. At this point, the NS dictionary 120 determines according to the response history that it reported back the first "server agent a1" in answer to a previous inquiry. Accordingly, the NS dictionary 120 reports back the "server agent a2" to the user agent u2 as a corresponding agent name (Step S109).

Subsequently, the user agent u2 replaces the original URI with a new one using the corresponding agent name obtained from the NS dictionary 120 (Step S110), and communicates with the server agent a2 indicated by the replaced URI (Step S11). Then, the server agent a2 communicates with the corresponding server application A2 (Step S112). Herewith, a desired content is sent to the user application U2, via the server agent a2 and the user agent u2, as a response from the server application A2.

Similarly when "URI://A/" is transmitted from the user application U3 to the corresponding user agent u3 (Step S113), the user agent u3 specifies the service URI "A" and inquires of the NS dictionary 120 about an agent name (Step S114). Based on the corresponding relationship illustrated in FIG. 8, the NS dictionary 120 determines that the service URI "A" corresponds to the "server agent a1", "server agent a2" and "server agent a3". The NS dictionary 120 further refers to the condition and response history, and specifies in a round robin manner a server agent placed earlier in the order of registration, not operating under a high load condition and having an older response history. At this point, the NS dictionary 120 determines according to the response histories that it sequentially reported back the first "server agent a1" and the next "server agent a2" previously. Accordingly, the NS dictionary 120 reports back the "server agent a3" to the user agent u3 as a corresponding agent name (Step S115).

Subsequently, the user agent u3 replaces the original URI with a new one using the corresponding agent name obtained from the NS dictionary 120 (Step S116), and communicates with the server agent a3 indicated by the replaced URI (Step S117). Then, the server agent a3 communicates with the corresponding server application A3 (Step S118). Herewith, a desired content is sent to the user application U3, via the server agent a3 and the user agent u3, as a response from the server application A3.

Similarly when "URI://A/" is transmitted from the user application U4 to the corresponding user agent u4 (Step S119), the user agent u4 specifies the service URI "A" and inquires of the NS dictionary 120 about an agent name (Step S120). Based on the corresponding relationship illustrated in FIG. 8, the NS dictionary 120 determines that the service URI "A" corresponds to the "server agent a1", "server agent a2" and "server agent a3". The NS dictionary 120 further refers to the condition and response history, and specifies in a round robin manner a server agent placed earlier in the order of registration, not operating under a high load condition and having an older response history. At this point, the NS dictionary 120 determines according to the response histories that it sequentially reported back the "server agent a1", "server agent a2" and "server agent a3" previously. In this case, the first "server agent a1" is a candidate for being reported back. However, assume here that the server agent a1 is operating under a high load condition. Accordingly, the NS dictionary 120 reports back the "server agent a2" to the user agent u4 as a corresponding agent name (Step S121).

Subsequently, the user agent u4 replaces the original URI with a new one using the corresponding agent name obtained from the NS dictionary 120 (Step S122), and communicates with the server agent a2 indicated by the replaced URI (Step S123). Then, the server agent a2 communicates with the corresponding server application A2 (Step S124). Herewith, a desired content is sent to the user application U4, via the server agent a2 and the user agent u4, as a response from the server application A2.

In this manner, even if accesses from the user applications U1-U4 . . . are concentrated on the service (application A) provided by the server applications A1-A3, load distribution to the server agents a1-a3 is achieved, whereby the conventional problem of load concentration on a certain process can be avoided. By increasing the number of server applications A1-A3 as well as the number of corresponding server agents a1-a3, the scale-out of the bus system 100 can be readily achieved.

<Push-Style Communication>

Figure 12:
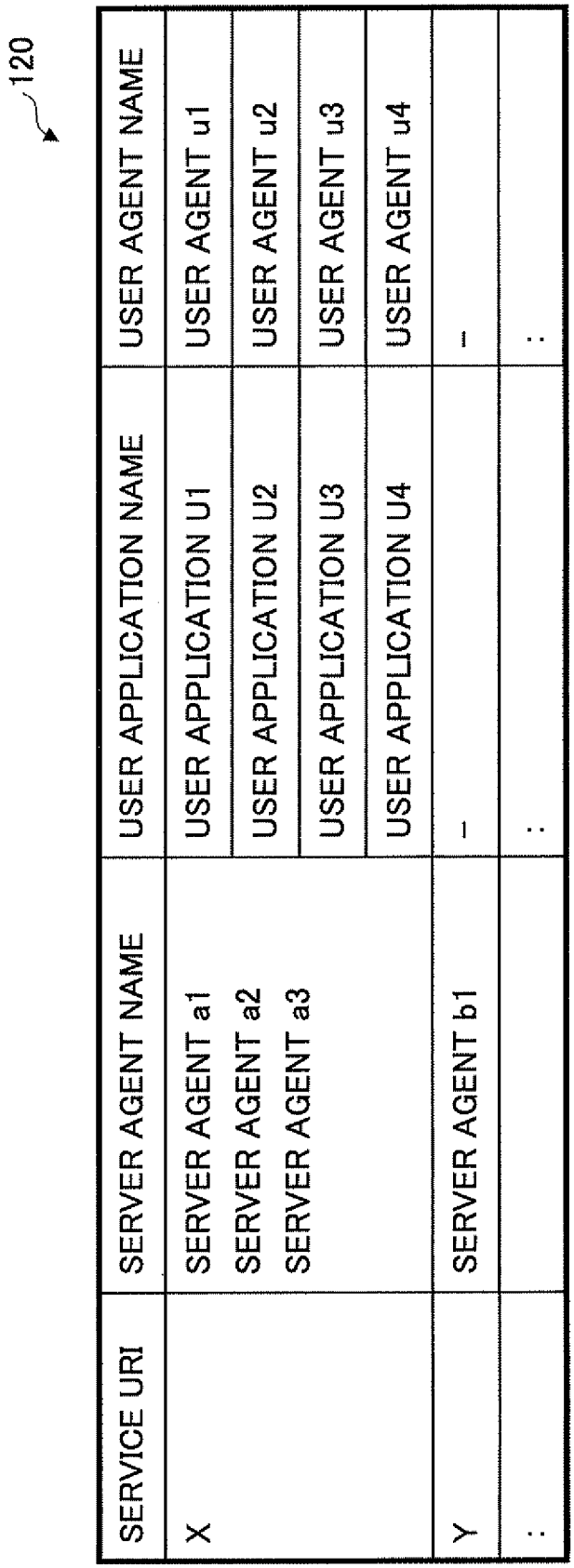
FIG. 12 shows an example of the NS dictionary applied to Push-style communication.

FIG. 12 shows an example of the NS dictionary 120 applied to Push-style communication. Referring to FIG. 12, the NS dictionary 120 includes a field for "service URI", each content of which indicates a URI at which a service specified by a server application is provided; a field for "server agent name", each content of which identifies a server agent corresponding to the service URI; a field for "user application name", each content of which identifies a user application preliminarily registered through the procedure for applying for the service; and a field of "user agent name", each content of which identifies a user agent corresponding to the user application.

Figure 13:
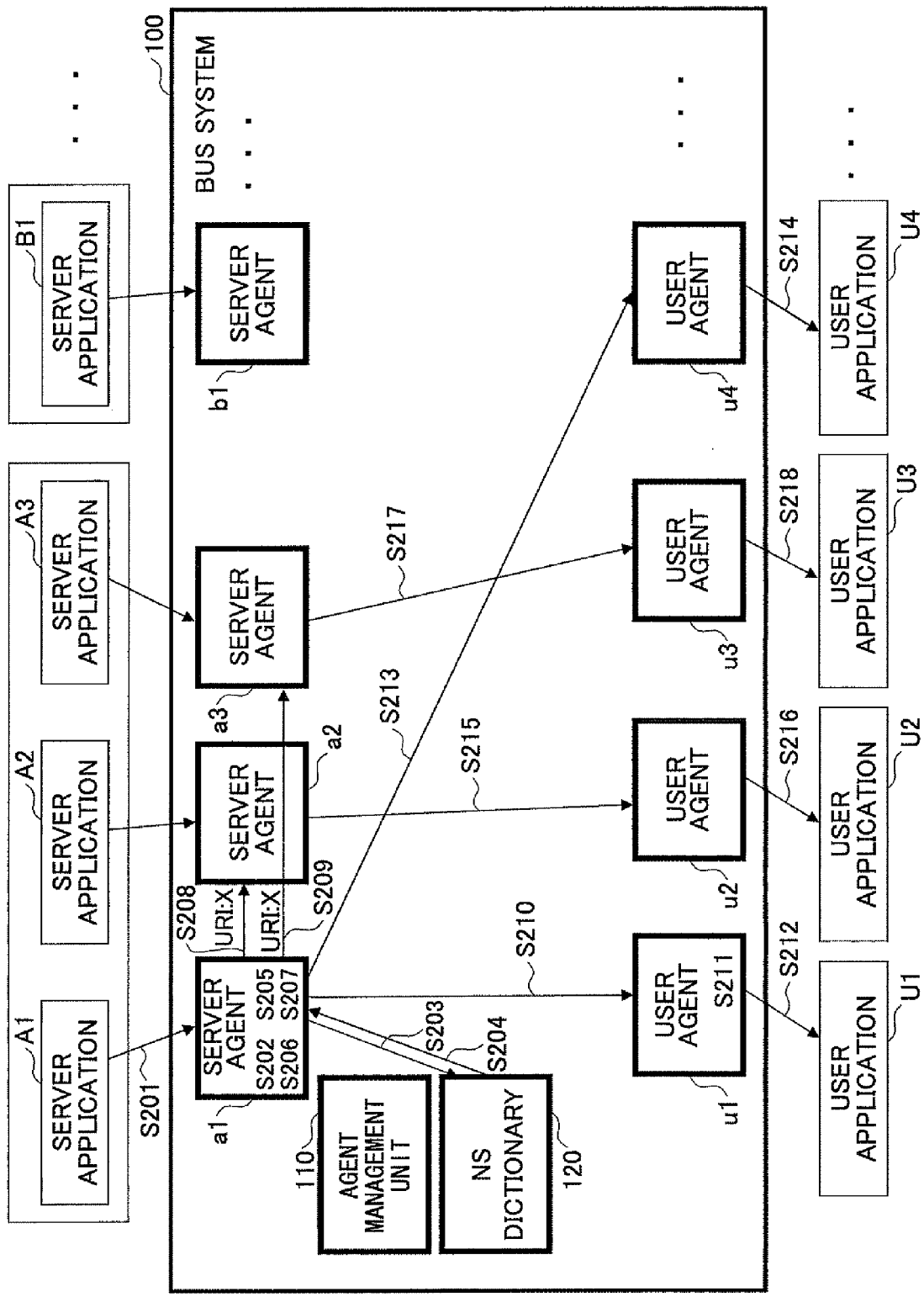
FIG. 13 shows an operational example in Push-style communication.
Figure 14:
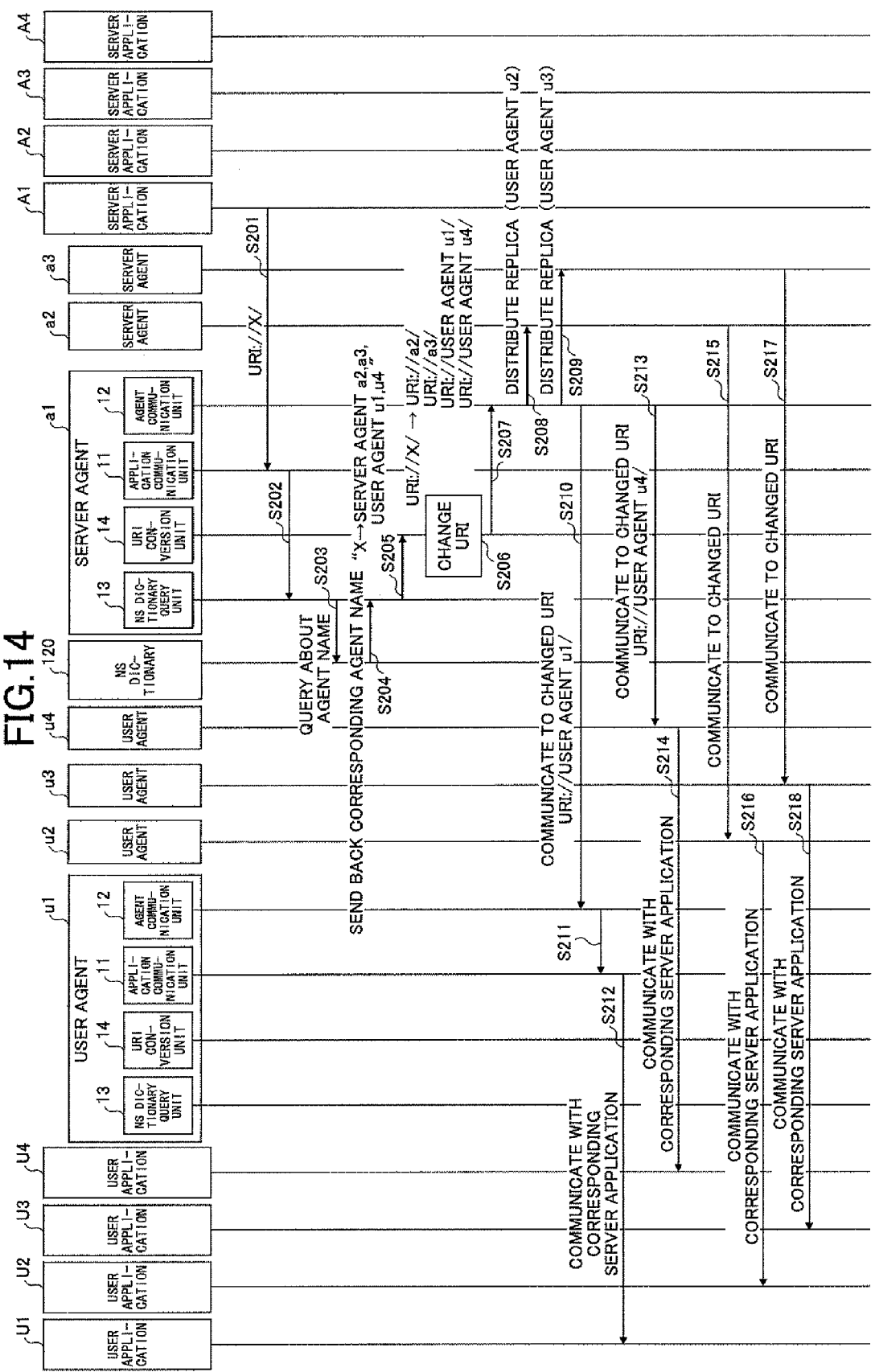
FIG. 14 is a sequence diagram of Push-style communication operation.

FIG. 13 shows an operational example in Push-style communication, and FIG. 14 is a sequence diagram of the operation. The configuration of FIG. 13 is the same as that of FIG.

5, except for the NS dictionary 120 being implemented and the scenario interpretation unit 130 being omitted.

Referring to FIGS. 13 and 14, when "URI://X/" is transmitted from the server application A1 to the corresponding server agent a1 (Step S201), the application communication unit 11 of the server agent a1 receives the URI information. The application communication unit 11 passes the received information to the NS dictionary query unit 13 (Step S202), which then specifies the service URI and inquires of the NS dictionary 120 about an agent name (Step S203), and subsequently receives corresponding agent names reported back from the NS dictionary 120 (Step S204). At this point, based on the corresponding relationship in the NS dictionary 120 illustrated in FIG. 12, the NS dictionary 120 reports back to the NS dictionary query unit 13, with respect to the service URI "X", the "server agent a2" and "server agent a3", except for the server agent a1 which has made the inquiry, as well as the "user agent u1" and "user agent u4" which correspond to users to be dealt with by the server agent a1 (in a round robin manner, the first "user agent u1" is selected, the next "user agent u2 and user agent u3" are left to the server agents a2 and a3, and the subsequent "user agent u4" is selected).

Subsequently, the NS dictionary query unit 13 passes the received information to the URI conversion unit 14 (Step S205), which then replaces the original URI with new ones using the corresponding agent names obtained from the NS dictionary 120 (Step S206) and passes the replaced URIs to the agent communication unit 12 (Step S207).

Next, the agent communication unit 12 delivers a content replica to the server agent a2 as specifying the user agent u2 to be a destination (Step S208), and also delivers the content replica to the server agent a3 as specifying the user agent u3 to be a destination (Step S209).

The agent communication unit 12 communicates with the user agent u1 (Step S210). On the user agent u1 side, the agent communication unit 12 receives information in the communication and passes the received information to the application communication unit 11 (Step S211), which then communicates with the corresponding user application U1 (Step S212). Similarly, the agent communication unit 12 of the server agent a1 communicates with the user agent u4 (Step S213), and the user agent 4 communicates with the corresponding user application U4 (Step S214).

On the other hand, the server agent a2 communicates with the user agent u2 (Step S215) which then communicates with the corresponding user application U2 (Step S216). Similarly, the server agent a3 communicates with the user agent u3 (Step S217), which then communicates with the corresponding user application U3 (Step S218).

According to the above-described operation, Push-style communication from the server application A1 to the user applications U1-U4 can be achieved.

<Scenario-Adaptive Operation>

Figure 15:
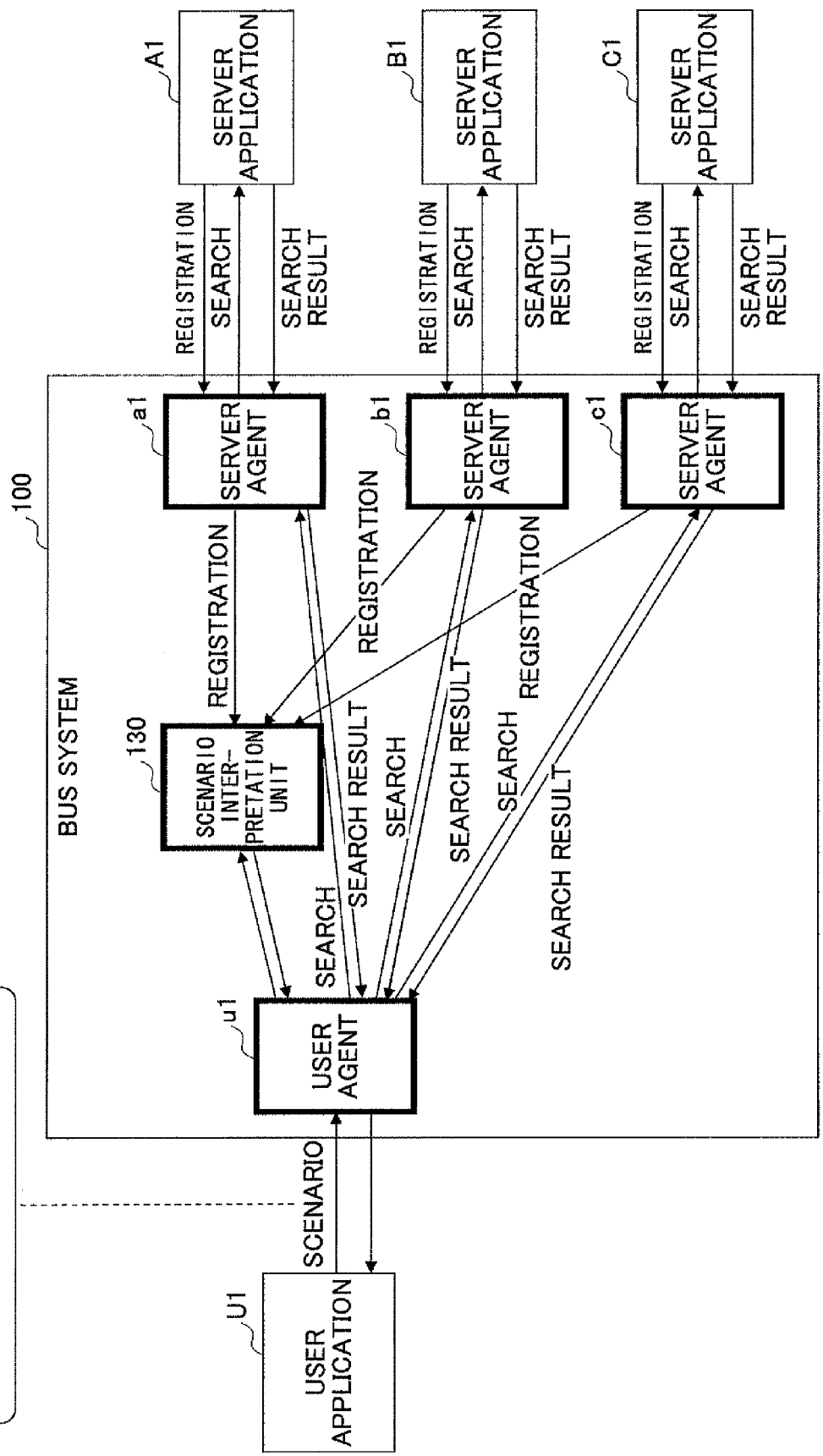
FIG. 15 shows an operational example corresponding to a scenario.

FIG. 15 shows an operational example corresponding to a scenario. Note that FIG. 15 illustrates a user application U1 on the user side and server applications A1, B1 and C1 on the server side. The bus system 100 includes a user agent u1 corresponding to the user application U1; server agents a1, b1 and c1 corresponding to the server application A1, B1 and C1, respectively; and the scenario interpretation unit 130.

The operation starts with transmission of a scenario from the user application U1 to the user agent u1 of the bus system 100. The scenario is written in the form of "<Scenario>Search</Scenario>", for example. "<Scenario>" is a tag indicating a start position of the scenario while "</Scenario>" is a tag indicating an end position of the scenario. The scenario in this case is a character string of "Search". The user application U1 also transmits "<Key>FJT</Key>" to the user agent u1 as a search keyword together with the scenario. "<Key>" is a tag indicating a start position of the keyword while "</Key>" is a tag indicating an end position of the keyword. The keyword in this case is a character string of "FJT".

Receiving the scenario, the user agent u1 specifies the scenario ("Search" in the above example) and inquires of the scenario interpretation unit 130, and subsequently obtains a response. The scenario interpretation unit 130 has a corresponding table as illustrated in FIG. 16. For the service name "Service", the server agents a1, b1 and c1 corresponding to the server application A1, B1 and C1, respectively, which provide the same search service have been registered. This registration is made based on requests sent from the server applications A1, B1 and C1 via the server agents a1, b1 and c1, respectively. Accordingly, in response to reception of the inquiry about the scenario "Search", the scenario interpretation unit 130 reports back to the user agent u1 the "server agent a1", "server agent b1" and "server agent c1" corresponding to the server applications A1, B1 and C1 providing search services.

The user agent u1 transmits a search request with the specification of the keyword "FJT" to each server agent a1, b1 and c1 reported by the scenario interpretation unit 130. Each server agent a1, b1 and c1 receives the request and transmits a search request with the specification of the keyword "FJT" to the corresponding server application A1, B1 and C1. Then, when receiving a search result from the corresponding server application A1, B1 and C1, each server agent a1, b1 and c1 transmits the search result to the user agent u1. The user agent u1 puts together the search results and transmits them to the user application U1.

In this manner, by specifying the scenario "Search", the user operating on the user application U1 is able to receive the service without being aware of the server applications A1, B1 and C1 that process the scenario even if applications offering search services increase in number.

As has been described above, the bus system according to one embodiment of the present disclosure allows for easy scale-out and is able to perform communication even if a target application is not determined.

<General Overview>

The above-described embodiment offers the following advantages:

(1) to be able to deal with both Pull-style communication and Push-style communication;

(2) to be able to achieve load distribution of the bus system;

(3) to be able to achieve scale-out of the bus system according to an increase in the number of the user applications (in the range of hundreds of thousands to several millions); in particular, to be adapted to network systems, such as an NGN, for which scalability is required; and (4) to be able to describe a service in an abstract way with the use of a scenario, and initiate communication even if a target server application is not determined; furthermore, to be able to simplify the application configuration.

Thus, the present disclosure has been described herein with reference to a preferred embodiment thereof. While the present disclosure has been shown and described with particular examples, it should be understood that various changes and modification may be made to the particular examples without departing from the scope of the broad spirit and scope of the present disclosure as defined in the claims. That is, the scope of the present disclosure is not limited to the particular examples and the attached drawings.

All examples and conditional language used herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a showing of the superiority or inferiority of the present disclosure. Although the embodiments of the present disclosure have been described in detail, it should be understood that various changes, substitutions, and alterations could be made hereto without departing from the spirit and scope of the present disclosure.

What is claimed is:

1. A bus system comprising:
  a storage part configured to store a program;
  a plurality of server agents corresponding one-to-one with server applications and implemented by a computer processor executing the program; and
  a plurality of user agents corresponding one-to-one with user applications and implemented by the computer processor executing the program;
  wherein each of the server agents includes a first server-agent communication unit configured to communicate with the corresponding one of the server applications; a server-agent determination unit configured to determine as communication targets one or more selected from the user agents and the other server agents; and a second server-agent communication unit configured to communicate with the communication targets determined by the server-agent determination unit, and
  each of the user agents includes a first user-agent communication unit configured to communicate with the corresponding one of the user applications; a user-agent determination unit configured to determine as communication targets one or more selected from the server agents and the other user agents; and a second user-agent communication unit configured to communicate with the communication targets determined by the user-agent determination unit.

2. The bus system as claimed in claim 1, wherein in a case where the first user-agent communication unit receives a service URI for identifying a service content from the corresponding one of the user applications, the user-agent determination unit queries a dictionary which includes a corresponding relationship between service URIs for identifying service contents and the server agents providing the service contents, and determines as the communication targets at least one of the server agents which corresponds to the received service URI and is operating under a low load condition.

3. The bus system as claimed in claim 2, wherein the user-agent determination unit specifies as candidates of the communication targets one or more of the server agents confirmed to correspond to the received service URI in the query, and determines one or more of the candidates in turn as the communication targets.

4. The bus system as claimed in claim 1, wherein in a case where the first server-agent communication unit receives a service URI for identifying a service content from the corresponding one of the server applications, the server-agent determination unit queries a dictionary which includes a corresponding relationship among service URIs for identifying service contents, the server agents providing the service contents and the user applications so as to specify one or more of the user applications corresponding to the received service URI as recipients of the service content identified by the received service URI, and determines as the communication targets one or more of the user agents corresponding to the recipients.

5. The bus system as claimed in claim 4, wherein the server-agent determination unit determines as the communication targets one or more of the other server agents confirmed to correspond to the received service URI in the query, and the second server-agent communication unit transmits to the determined communication targets the service content identified by the received service URI or a replica of the received service URI so that the service content identified by the received service URI or the replica is transmitted from the determined communication targets to one or more of the user agents corresponding to, among the one or more of the user applications specified as the recipients of the service content identified by the received service URI, one or more of the user applications for which the server agent does not provide the service content identified by the received service URI.

6. The bus system as claimed in claim 1, wherein in a case where the first user-agent communication unit receives a scenario for indicating a desired service from the corresponding one of the user applications, the user-agent determination unit queries a scenario interpretation unit configured to interpret the scenario so as to determine as the communication targets one or more of the server agents corresponding to one or more of the server applications capable of processing the scenario.

7. A bus system control method applied to a bus system including a plurality of server agents corresponding one-to-one with server applications and a plurality of user agents corresponding one-to-one with user applications, the bus system control method comprising:
  allowing, performed by a computer processor, at least one of the user agents to communicate with the corresponding one of the user applications;
  determining, performed by the computer processor, as communication targets of one of the user agents, one or more selected from the server agents and the other user agents;
  allowing, performed by the computer processor, the one of the user agents to communicate with the communication targets; and
  allowing, performed by the computer processor, at least one of the server agents to communicate with the corresponding one of the server applications.

8. The bus system control method as claimed in claim 7, wherein in a case where a scenario for indicating a desired service is received from the corresponding one of the user applications, a query is made to a scenario interpretation unit configured to interpret the scenario so that one or more of the server agents corresponding to one or more of the server applications capable of processing the scenario are determined as the communication targets.

9. The bus system control method as claimed in claim 7, wherein in a case where the one of the user agents receives a service URI for identifying a service content from the corresponding one of the user applications, a query is made to a dictionary which includes a corresponding relationship between service URIs for identifying service contents and the server agents providing the service contents, and at least one of the server agents which corresponds to the received service URI and is operating under a low load condition is determined as the communication targets.

10. The bus system control method as claimed in claim 9, wherein one or more of the server agents confirmed to correspond to the received service URI in the query are specified as candidates of the communication targets, and one or more of the candidates are determined in turn as the communication targets.

11. A bus system control method used on a bus system including a plurality of server agents corresponding one-to-one with server applications and a plurality of user agents corresponding one-to-one with user applications, the bus system control method comprising:
    allowing, performed by a computer processor, at least one of the server agents to communicate with the corresponding one of the server applications;
    determining, performed by the computer processor, as communication targets of one of the server agents, one or more selected from the user agents and the other server agents;
    allowing, performed by the computer processor, the one of the server agents to communicate with the communication targets; and
    allowing, performed by the computer processor, at least one of the user agents to communicate with the corresponding one of the user applications.

12. The bus system control method as claimed in claim 11, wherein in a case where the one of the server agents receives a service URI for identifying a service content from the corresponding one of the server applications, a query is made to a dictionary which includes a corresponding relationship among service URIs for identifying service contents, the server agents providing the service contents and the user applications so as to specify one or more of the user applications corresponding to the received service URI as recipients of the service content identified by the received service URI, and one or more of the user agents corresponding to the recipients are determined as the communication targets.

13. The bus system control method as claimed in claim 12, wherein one or more of the other server agents confirmed to correspond to the received service URI in the query are determined as the communication targets, and the service content identified by the received service URI or a replica of the received service URI is transmitted to the determined communication targets so as to be transmitted from the determined communication targets to one or more of the user agents corresponding to, among the one or more of the user applications specified as the recipients of the service content identified by the received service URI, one or more of the user applications for which the server agent does not provide the service content identified by the received service URI.

* * * * *